United States Patent
Braun et al.

(10) Patent No.: US 9,657,620 B2
(45) Date of Patent: May 23, 2017

(54) EXHAUST GAS SYSTEM

(71) Applicant: Daimler AG, Stuttgart (DE)

(72) Inventors: Tillmann Braun, Berglen (DE);
Berthold Keppeler, Owen (DE);
Bernhard Kobiela, Walheim (DE);
Alexander Mackensen, Boeblingen (DE); Antonio Pepe, Stuttgart (DE);
Timo Schmidt, Waldenbuch (DE);
Michael Schroepel, Boeblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/438,429

(22) PCT Filed: Sep. 28, 2013

(86) PCT No.: PCT/EP2013/002923
§ 371 (c)(1),
(2) Date: Apr. 24, 2015

(87) PCT Pub. No.: WO2014/063772
PCT Pub. Date: May 1, 2014

(65) Prior Publication Data
US 2015/0275728 A1     Oct. 1, 2015

(30) Foreign Application Priority Data

Oct. 26, 2012   (DE) .................. 10 2012 021 017

(51) Int. Cl.
*F01N 13/08*    (2010.01)
*F01N 3/20*     (2006.01)
(Continued)

(52) U.S. Cl.
CPC .............. *F01N 3/20* (2013.01); *F01N 3/2066* (2013.01); *F01N 3/2892* (2013.01);
(Continued)

(58) Field of Classification Search
CPC ........ F01N 1/086–1/088; F01N 3/0296; F01N 3/2892; F01N 2240/20; F01N 2470/18;
(Continued)

(56) References Cited

U.S. PATENT DOCUMENTS

2007/0274877 A1*  11/2007  Bush ............... B01D 53/9431
                                                      422/176
2009/0262599 A1*  10/2009  Kohrs ................ B01F 5/0643
                                                      366/337
(Continued)

FOREIGN PATENT DOCUMENTS

CN         101627190 A       1/2010
DE    20 2007 010 324 U1    1/2009
(Continued)

OTHER PUBLICATIONS

German Search Report dated Jun. 24, 2013 with partial English-language translation (ten (10) pages).
International Search Report dated Jan. 7, 2014 with English-language translation (four (4) pages).
German-language Written Opinion (PCT/ISA/237) dated Jun. 24, 2013 (five (5) pages).
Japanese Office Action issued in Japanese counterpart application No. 2015-538314 dated Mar. 29, 2016, with partial English translation (Seven (7) pages).
Chinese Office Action issued in counterpart Chinese Application No. 201380055980.9 dated Sep. 12, 2016 with English-language translation (nine (9) pages).

*Primary Examiner* — Jonathan Matthias
(74) *Attorney, Agent, or Firm* — Crowell & Moring LLP (57) ABSTRACT

A system for exhaust gas routing and aftertreatment in a motor vehicle includes a first exhaust gas duct element, which has an inlet opening and an outlet opening, and a second exhaust gas duct element, which has a transfer pipe having a longitudinal axis and having a sleeve surface and a first closed end. An intake opening is provided in the sleeve surface adjacent to the closed end. The transfer pipe projects into the outlet opening and is accommodated in the first exhaust gas duct element by its closed end and the intake opening, so that exhaust gas flowing in through the inlet opening in a first direction can flow through the intake opening and into the transfer pipe and flow—viewed in the direction of the longitudinal axis of the transfer pipe—in the transfer pipe through the outlet opening out of the first (Continued)

exhaust gas duct element. The system also includes an injector unit fixed to the first exhaust gas duct element for introducing a reducing agent into an exhaust gas flow flowing through the first and the second exhaust gas duct element.

20 Claims, 3 Drawing Sheets

(51) Int. Cl.
*F01N 3/28* (2006.01)
*F01N 13/00* (2010.01)

(52) U.S. Cl.
CPC ........ *F01N 13/009* (2014.06); *F01N 2240/20* (2013.01); *F01N 2470/18* (2013.01); *F01N 2610/02* (2013.01); *F01N 2610/102* (2013.01); *F01N 2610/1453* (2013.01); *Y02T 10/24* (2013.01)

(58) Field of Classification Search
CPC .......... F01N 2610/1453; B01F 3/04049; B01F 5/0473; B01F 5/0606; B01F 5/0648
See application file for complete search history.

(56) References Cited

U.S. PATENT DOCUMENTS

| | | | |
|---|---|---|---|
| 2010/0083643 | A1 | 4/2010 | Hayashi et al. |
| 2010/0107612 | A1 | 5/2010 | Yamazaki et al. |
| 2010/0263359 | A1 | 10/2010 | Haverkamp et al. |
| 2011/0308234 | A1* | 12/2011 | De Rudder ......... B01F 3/04049 60/295 |

FOREIGN PATENT DOCUMENTS

| | | |
|---|---|---|
| DE | 10 2011 120 685 A1 | 7/2012 |
| EP | 1 262 644 A2 | 12/2002 |
| EP | 2128 398 A1 | 12/2009 |
| GB | 2 381 218 A | 4/2003 |
| JP | 2009-150338 A | 7/2009 |
| JP | 2011-99390 A | 5/2011 |
| JP | 2014-74387 A | 4/2014 |
| WO | WO 2008/111254 A1 | 9/2008 |
| WO | WO 2011/110885 A1 | 9/2011 |
| WO | WO 2012/047159 A1 | 4/2012 |

* cited by examiner

EXHAUST GAS SYSTEM

BACKGROUND AND SUMMARY OF THE INVENTION

Exemplary embodiments of the invention relate to an exhaust gas system for exhaust gas routing and exhaust gas aftertreatment in a motor vehicle.

Exhaust gas systems of the kind addressed here are generally used for routing the exhaust gas within an exhaust gas train of an internal combustion engine and for aftertreatment of the exhaust gas, in particular for reducing a particulate and/or harmful substance concentration. Typically, in particular for reducing nitrogen oxides, reducing agents in an initial liquid state, such as mineral oil fuel or an aqueous urea solution, are injected into the exhaust gas flowing through the exhaust gas system. In order to obtain an efficient reduction of hazardous substances and a chemical reaction that is as complete as possible, it is necessary to vaporize the reducing agent and distribute it is uniformly as possible in the exhaust gas flow. If an aqueous urea solution is used, the urea must be converted to ammonia by means of hydrolysis and/or thermolysis so that a selective catalytic nitrogen oxide reduction can be subsequently carried out.

An exhaust gas system, which has a first exhaust gas duct element with an inlet opening and an outlet opening, is disclosed in European patent application EP 2 128 398 A1, wherein the first exhaust gas duct element is in the form of an outlet funnel of a particulate filter. A second exhaust gas duct element has a transfer pipe with a longitudinal axis and a sleeve surface. This projects into the outlet opening of the first exhaust gas duct element and the end thereof projects into the outlet opening rests closely against a wall of the first exhaust gas duct element, thus closing the first end. A multiplicity of intake openings, which are formed as a rectangular slot and are distributed uniformly—viewed in the circumferential direction—over the sleeve surface, are provided in the sleeve surface adjacent to the closed end. The transfer pipe therefore has intake openings along its entire circumference adjacent to the first closed end. It is accommodated in the first exhaust gas duct element by means of its closed end and the intake openings so that exhaust gas flowing in through the inlet openings in a first direction can flow into the transfer pipe through the intake openings. The exhaust gas then flows—viewed in the direction of the longitudinal axis of the transfer pipe—in the transfer pipe, through the outlet opening and out of the first exhaust gas duct element. An injector unit for introducing a reducing agent into the exhaust gas flow is provided at the first exhaust gas duct element.

Here, it can be seen that the longitudinal axis of the transfer pipe is arranged parallel to the first direction in which exhaust gas flows through the inlet opening into the first exhaust gas duct element. Therefore, in order to pass from the inlet opening into the transfer pipe and through this through the outlet opening, the exhaust gas must be deflected by substantially 180°. In particular, the exhaust gas must initially be deflected by substantially 90°—starting from the inlet opening—to be able to flow into the intake openings. A further deflection by substantially 90° then takes place in the transfer pipe. A relatively intricate flow path for the exhaust gas is formed in this way and is associated with a pressure loss. A swirling of the exhaust gas formed in the transfer pipe, which mixes the injected reducing agent with the exhaust gas, has a reduced swirl rate, as the exhaust gas has already lost kinetic energy due to the first 90° deflection from the inlet opening to the intake openings. It can also be seen that the injector unit is arranged such that the reducing agent is injected into the transfer pipe downstream of the intake openings. For this reason, a mixing section arranged downstream of the intake openings for vaporizing and mixing reducing agent with the exhaust gas must be made comparatively long, which has a detrimental effect on the installation length of the second exhaust gas duct element and therefore also the exhaust gas system as a whole.

Exemplary embodiments of the invention are therefore directed to an exhaust gas system with an increased swirl rate making optimum use of the kinetic flow energy of the exhaust gas and a comparatively compact design with a shortest possible mixing section.

As the longitudinal axis of the transfer pipe lies substantially perpendicular to the first direction in which the exhaust gas flows through the inlet opening into the first exhaust gas duct element, it is possible for the inflowing exhaust gas to pass from the inlet opening into the intake opening without deflection, in particular without 90° deflection. This substantially prevents a loss of kinetic energy in the exhaust gas flow, thus enabling an exhaust gas swirl with high swirl rate to be established when the exhaust gas flows into the transfer pipe. As the reducing agent can be injected by the injector unit into the first exhaust gas duct element upstream of the intake opening, early injection takes place—viewed in the flow direction—thus enabling the mixing section to be optimally utilized, particularly in the transfer pipe. At the same time, the reducing agent vaporizes, preferably at least partially, before entering the transfer pipe. Together with the highly efficient swirl with high swirl rate, this results in rapid vaporization and mixing of the reducing agent with the exhaust gas, as a result of which hydrolysis and/or thermolysis of urea is accelerated. The mixing section itself can therefore be made shorter than in the known exhaust gas system, which has an advantageous effect on the length of the second exhaust gas duct element and therefore also the exhaust gas system as a whole.

Preferably, the intake opening is connected directly to the closed end of the transfer pipe and is therefore—viewed in the longitudinal direction—not spaced apart therefrom or only spaced apart therefrom to a small extent. However, it is possible for the intake opening to be at a short distance—compared with its longitudinal extension—from the closed end.

The transfer pipe therefore projects into the outlet opening such that the intake opening is completely arranged in the first exhaust gas duct element. In doing so, it is made a short as possible and it therefore preferably extends not very much further into the first exhaust gas duct element than a longitudinal extension of the intake opening. From this, it also follows that—measured in the longitudinal direction—a distance from the closed end of the transfer pipe to the intake opening is made as small as possible in order not to extend the length of the transfer pipe projecting into the first exhaust gas duct element unnecessarily and to avoid dead zones for the exhaust gas flow.

The transfer pipe is preferably accommodated in the outlet opening in an interlocking manner. Accordingly, an edge of the outlet opening encompasses the transfer pipe with a matching contour and with a complementary shape, in a close-fitting and preferably sealing manner, so that no exhaust gas can escape from the first exhaust gas duct element between an edge of the outlet opening and the sleeve surface of the transfer pipe. Particularly preferably, the transfer pipe is additionally joined to the first exhaust gas duct element in the region of the outlet opening by substance-to-substance bonding, preferably welded. This results in a particularly well sealed connection. All the exhaust gas flowing into the first exhaust gas duct element through the inlet opening must therefore flow via the intake opening and through the transfer pipe out of the first exhaust gas duct element, as there is no other outgoing flow path therefrom.

With the help of the injector unit, preferably, an aqueous urea solution is injected into the exhaust gas flow, wherein the urea is converted to ammonia in the mixing section by means of hydrolysis and/or thermolysis. In this case, a catalytically active element, in particular a catalytic converter for carrying out a selective catalytic reduction, which converts nitrogen oxide with the ammonia to form elementary nitrogen and water, is preferably provided after the mixing section. However, in an exemplary embodiment of the exhaust gas system, it is also possible for a different reducing agent, which in the initial state is preferably liquid, such as a mineral oil fuel for example, to be injected into the exhaust gas flow.

Preferably the exhaust gas system includes transfer pipe that is cylindrical at least in the region of the intake opening. Preferably, the cylindrical geometry has an oval base surface so that—viewed in cross-section—the transfer pipe is oval in shape. As a result of the intake opening, which is preferably arranged centrally in the oval transfer pipe, inflowing exhaust gas forms a double vortex, as a result of which a particularly efficient mixing of the reducing agent injected into the exhaust gas flow can be effected. Preferably, the geometry of the transfer pipe is chosen such that two opposing exhaust gas flow vortices are formed with—viewed in cross-section—approximately circular progression. In this case, the vortices are particularly stable. They are therefore preferably also maintained over a whole length of the mixing section.

In another exemplary embodiment, it is possible for the transfer pipe to have a cross-sectional form corresponding to two circular segments placed adjacent to one another. In this case too, it is possible, particularly when the intake opening is arranged centrally, to form a stable double vortex in the transfer pipe that is maintained over a length of the whole mixing section. The length of the mixing section is preferably at least 200 mm to 300 mm or even more.

In yet another exemplary embodiment, it is possible for the transfer pipe to be formed cylindrically with a circular base surface. In this case, the intake opening is preferably arranged off center and in particular such that the exhaust gas flows into the transfer pipe tangentially. This then forms a stable single vortex, as a result of which good mixing of the reducing agent with the exhaust gas is likewise achieved.

If the transfer pipe—viewed in cross-section—is in the form of an oval, a ratio of a longer cross-sectional axis to a shorter cross-sectional axis is at least 1.5 up to a maximum of 2. If the exhaust gas system is used in conjunction with an internal combustion engine of a motor vehicle, the capacity of which lies in the range from approximately 1.6 liters to 3.5 liters, the length of the shorter cross-sectional axis is preferably at least 30 mm up to a maximum of 100 mm. Exemplary embodiments with different dimensions or ratios are, of course, possible.

Also preferred is an exhaust gas system in which the transfer pipe has only one intake opening. This is arranged facing away from the inlet opening of the first exhaust gas duct element so that the exhaust gas flowing in through the inlet opening must initially flow around the transfer pipe before then being able to flow into the transfer pipe through the intake opening, effectively in the opposite direction to the inlet direction. As a result of the flow reversal of the transfer pipe, the exhaust gas is already endowed with a swirl and flows into the transfer pipe with a tangential speed component. Particularly preferably, the exhaust gas flow flows around the transfer pipe on both sides and, in this respect, is divided into two partial flows, which—viewed in the flow direction—flow past the transfer pipe to right and left and meet one another behind it in the region of the intake opening. The partial flows passing into the transfer pipe therefore have tangential speed components pointing in opposite directions so that a very stable double vortex is formed in a particularly efficient manner and with high swirl rate.

Here, preferably, a wall of the first exhaust gas duct element is curved inwards in the region of the closed end of the second exhaust gas duct element such that it seals tightly with the closed end. This prevents exhaust gas from being able to flow beyond the closed end of the transfer pipe and in this way passing to the intake opening. The whole of the exhaust gas flow must therefore flow around the transfer pipe to the intake opening, which increases the stability and swirl rate of the vortex formed, in particular of the double vortex.

The intake opening preferably has a larger extension in the direction of the longitudinal axis of the transfer pipe than perpendicular thereto. It is therefore elongated—viewed in the longitudinal direction—wherein the ratio of a longitudinal extension to a transverse extension of the intake opening is preferably at least 1.5 to a maximum of 4. Particularly preferably, the intake opening is in the form of a slot with substantially rectangular penetration area. Here, the ratio of the long side of the rectangle to the short side of the rectangle is preferably at least 1.5 to a maximum of 4. It is possible for the substantially rectangular penetration area to be rounded in the region of the corners. In particular, the shape of a rectangular slot for the intake opening enables a particularly stable formation of a double vortex of the exhaust gas flow in the transfer pipe.

The intake opening preferably extends over the whole length of the transfer pipe projecting into the first exhaust gas duct element, i.e., from an inner side of the outlet opening to the closed end. The shorter transverse dimension of the intake opening is preferably less than the shorter cross-sectional axis of the oval transfer pipe.

Also preferred is an exhaust gas system in which the first exhaust gas duct element is in the form of an outlet funnel of an oxidation catalytic converter. Particularly preferably, the inlet opening effectively overlaps an outlet side of the oxidation catalytic converter, so that the first exhaust gas duct element is arranged at an output of the oxidation catalytic converter in the form of an exhaust gas manifold element. The exhaust gas system is therefore preferably formed overall such that the transfer pipe projects into the outlet funnel of the oxidation catalytic converter. The mixing device formed by the injector unit and the transfer pipe is therefore also arranged downstream of the oxidation catalytic converter, preferably flanged thereto.

Also preferred in this regard is an exhaust gas system in which the first exhaust gas duct element is scoop-shaped. Here, an imaginary plane defined by the inlet opening, namely an imaginary plane perpendicular to which the flow direction of the exhaust gas through the inlet opening lies, is oriented substantially, preferably exactly, perpendicular to an imaginary plane defined by the outlet opening, namely an imaginary plane perpendicular to which the exhaust gas flow through the outlet opening lies. A diversion of the exhaust gas flow by substantially, preferably exactly 90°, therefore takes place from the inlet opening to the outlet opening. At the same time, the first exhaust gas duct element overlaps the transfer pipe projecting into it. As a result, the arrangement of the first exhaust gas duct element and the second exhaust gas duct element overall effectively has the shape of an air scoop. The 90° deflection of the exhaust gas flow occurs substantially when the exhaust gas flows into the transfer pipe, where, starting from the intake opening, it impinges against a wall of the transfer pipe arranged opposite, wherein, on the one hand, the vortex, in particular double vortex, is formed, and wherein, on the other, the exhaust gas flow is deflected by 90°, as the transfer pipe is closed at its first end which projects into the exhaust gas duct element.

Preferably, the first exhaust gas duct element has a flow chamber which—viewed in the first direction—with regard to the transfer pipe is arranged before the intake opening and faces away from the inlet opening. This means that—viewed in the flow direction of the exhaust gas from the inlet opening—a flow chamber, in which the exhaust gas, which flows around the transfer pipe, collects in front of the intake opening facing away from the inlet opening before it passes through it into the transfer pipe, is arranged after the transfer pipe. The injector unit is arranged and aligned such that an injection stream thereof is directed into this flow chamber. Here, the term "injection stream" on the one hand refers to the reducing agent injected by the injector unit and, on the other, the emission characteristic of the injector unit, wherein the emission characteristic is substantially conical. Here, the conical stream of reducing agent opens in a direction pointing away from the injector unit. The injection stream, in particular a longitudinal axis of the conical stream, is preferably oriented approximately parallel, at the most at an acute angle, to the longitudinal axis of the transfer pipe and particularly preferably aligned away from the intake opening. Here, the injector unit is preferably fixed to the first exhaust gas duct element in close spatial proximity to the closed end of the transfer pipe, so that the injection stream emerges from a region which is arranged close to the closed end and recedes from the intake opening and the transfer pipe along its propagation direction at a preferably small, acute angle.

Preferably, the injector unit is designed such that it injects a plurality of conical streams, particularly preferably two conical streams, into the flow chamber, wherein the conical streams are arranged one after the other in a direction that is oriented perpendicular to the longitudinal direction of the transfer pipe and parallel to the first direction. At the same time, the longitudinal axis of the rear conical stream—viewed from the transfer pipe in the first direction—preferably has a larger angle to the longitudinal axis of the transfer pipe than a corresponding front conical stream.

In all cases, the reducing agent is injected into the flow chamber formed by the first exhaust gas duct element upstream of the intake opening, that is to say mixed with the exhaust gas flow at a point at which it has not yet entered the transfer pipe and therefore the second exhaust gas duct element. As a result, a comparatively early mixing of the reducing agent with the hot exhaust gas coming from the oxidation catalytic converter takes place. This promotes a vaporization of the reducing agent which, in addition, is mixed particularly efficiently with the exhaust gas flowing into the transfer pipe and forms a swirl, preferably a double swirl. This enables the mixing section to be shortened, and particularly homogenous mixing takes place, which, in particular, is further assisted by forming a double vortex. In doing so, in particular the injection immediately before the intake opening has been shown to be favorable, as an intensive, rapid flow of exhaust gas into the transfer pipe, which carries along, swirls and vaporizes the reducing agent, occurs here.

Also preferred is an exhaust gas system with at least one substantially plate-shaped baffle element, which is fixed to the transfer pipe and/or to the first exhaust gas duct element, is provided in the flow chamber. Preferably, the baffle element is welded to the transfer pipe and/or to the first exhaust gas duct element. At the same time, it is possible for the baffle element to be fixed exclusively to the transfer pipe, preferably welded thereto. It is also possible for the baffle element to be fixed exclusively to the first exhaust gas duct element, preferably welded thereto. Finally, it is possible for the baffle element to be fixed both to the transfer pipe and to the first exhaust gas duct element, preferably welded thereto. The baffle element has a baffle surface facing the injector unit, the normal vector of which is aligned substantially parallel, preferably exactly parallel, to the longitudinal axis of the transfer pipe. At the same time, the baffle element preferably overlaps the intake opening along a direction which is orientated transversely, preferably perpendicular, to the longitudinal axis of the transfer pipe. Ultimately, the baffle element, which is preferably in the form of a baffle plate, is arranged in the flow chamber such that it is impacted at least in certain areas by the at least one injection stream. Reducing agent which impinges on the baffle element preferably bounces off, wherein the drops which bounce off burst into smaller drops and as a result vaporize more quickly.

As a result of the wall contact with a wall of the transfer pipe and/or a wall of the exhaust gas duct element to which it is preferably fixed, the baffle element is heated by thermal conduction. It is also heated by the passing exhaust gas. The baffle element therefore acts as a vaporization element, by means of which vaporization heat is dissipated to the impinging reducing agent. Separate heating of the at least one baffle element is also possible. Preferably, the baffle element also has a temperature above a Leidenfrost temperature of the reducing agent. This guarantees efficient vaporization and also efficient bouncing-off of reducing agent drops on the baffle element.

Preferably, the injection stream impinges on a wall of the first exhaust gas duct element. Here too, drops preferably bounce off and reducing agent is vaporized at the hot wall.

To assist vaporization on the baffle surface of the baffle element, it can have a surface form that preferably comprises pimples. Alternatively or in addition, roughening and/or a coating can be provided. A preferred value for a surface roughness lies in the range from at least 5 µm to a maximum of 50 µm. Preferably, a catalytic coating which supports thermolysis and/or hydrolysis of urea can be provided as the coating. It is also possible to provide a coating which, in addition or alternatively, counteracts the formation of a deposit, in particular by deposition of urea decomposition products. The baffle surface coating preferably includes titanium dioxide, particularly preferably it consists of titanium dioxide.

As the reducing agent at least partially vaporizes due to the contact with the at least one baffle element and/or wall of the first exhaust gas duct element before entering the intake opening of the transfer pipe and/or is fed to a hydrolysis or thermolysis reaction, the efficiency of the mixing section is considerably increased. This can therefore be shortened, as a result of which the exhaust gas system can have a particularly compact form.

The at least one baffle element and/or the injector unit are preferably arranged relative to one another such that the injection stream impinges on the baffle surface with an angle of incidence of preferably less than 45° relative to a normal vector. Particularly preferably, the reducing agent is injected in such a way that it impinges on the baffle surface at least approximately perpendicularly, as a result of which particularly good wetting thereof is achieved.

The at least one baffle element is preferably also aligned substantially parallel to the exhaust gas flow flowing around the transfer pipe and into the intake opening. The at least one baffle element therefore forms a minimal flow resistance for the exhaust gas, so that a pressure loss in the region of the baffle element is minimized or prevented, and as a result of which a vaporization, interaction and mixing of the reducing agent with the exhaust gas in the region of the baffle element is intensified.

Also preferred is an exhaust gas system with a plurality of baffle elements are provided. Particularly preferably, at least three, preferably up to eight baffle elements are provided. Preferably, the baffle elements are arranged one after the other—viewed in the direction of the longitudinal axis of the transfer pipe—and preferably parallel to one another with regard to their baffle surfaces. Accordingly, the normal vectors of the baffle surfaces preferably point at least approximately in the same direction. As a result, it is particularly possible for drops of the reducing agent to bounce off different baffle elements several times, wherein a drop bursts into smaller drops on each impact, thus significantly accelerating the vaporization of the reducing agent.

Also preferred in this context is an exhaust gas system in which the baffle elements each have a cutout in the baffle surface. This is preferably arranged such that the injection stream is directed at the cutout in certain areas. This means that part of the reducing agent emitted by the injector unit passes through the cutout, while another part impinges on the baffle surface surrounding the cutout so that the injection stream is ultimately peeled off by the baffle elements. This results in the formation of a vortex at the edges of the cutouts, which further improves the mixing of the reducing agent with the exhaust gas and the vaporization thereof.

Preferred in this context is an exhaust gas system in which—viewed in the direction of the injection stream—penetration areas defined by the cutouts of the baffle elements reduce along a series of baffle elements. The cutouts have penetration areas for the reducing agent, wherein the penetration area of each cutout of a baffle element reduces from baffle element to baffle element—viewed in the direction of the injection stream. As a result, the injection stream is peeled off to a greater extent from baffle element to baffle element, which improves the formation of vortices at the edges, the bouncing-off behavior, the vaporization behavior and therefore the hydrolysis and/or thermolysis, and finally, the mixing of the reducing agent with the exhaust gas. At the same time, preferably, a depth of the cutouts—measured in a direction perpendicular to a plane defined by the intake opening—reduces from baffle element to baffle element. Preferably, in addition or alternatively, it is provided that a width of the cutouts—measured perpendicular to the depth—also reduces from baffle element to baffle element. In a particularly preferred exemplary embodiment, both the depth and the width of the cutouts—viewed in the direction of the injection stream—reduce along the series of baffle elements.

Also preferred is an exhaust gas system in which the injector unit is arranged and aligned such that the injection stream is symmetrically arranged with respect to a plane of symmetry defined by the first direction and by the longitudinal direction and that divides the intake opening symmetrically. The plane of symmetry is accordingly determined in that both the first direction, that is to say the flow direction of the exhaust gas through the intake opening, and the longitudinal direction of the transfer pipe lie therein. The position of the plane of symmetry is further defined in that it divides the intake opening symmetrically into two equally sized half areas. The injector unit is now arranged and aligned such that the injection stream is also preferably arranged mirror-symmetrically with respect to this plane of symmetry.

In this context, it is also preferred that the at least one baffle element, preferably all baffle elements, are designed and arranged mirror-symmetrically with respect to the plane of symmetry. This results in an overall mirror-symmetrical arrangement of the geometry of the preferably oval transfer pipe, the injector unit, the injection stream and the baffle elements. Particularly when the transfer pipe is oval, this results in a mirror-symmetrical double vortex with respect to the plane of symmetry, wherein, as a result of the likewise symmetrically arranged injector unit, the symmetrical injection stream and the symmetrical baffle elements, a particularly homogenous, uniform distribution of the reducing agent in the symmetrical double vortex is produced. This ensures that the reducing agent is homogenously distributed in the whole exhaust gas flow, thus enabling a hazardous substance concentration to be extensively reduced.

Also preferred is an exhaust gas system in which the intake opening, which faces away from the inlet opening, is designed as a main intake opening which preferably has a larger extension in the direction of the longitudinal axis of the transfer pipe than perpendicular thereto, wherein it is particularly preferably designed as a slotted and substantially rectangular penetration area, and wherein, furthermore, at least one auxiliary intake opening, which—viewed along the first direction—is preferably arranged at the side of the main intake opening, is provided in the sleeve surface of the transfer pipe. The auxiliary intake opening preferably has a smaller penetration cross-section than the main intake opening. At the same time, it preferably has a larger extension in the direction of the longitudinal axis of the transfer pipe than perpendicular thereto. Particularly preferably, it is in the form of a slot with rectangular penetration area. Particularly preferably, both the main intake opening and the at least one auxiliary intake opening are in the form of a rectangular slot, wherein, however, the auxiliary intake opening preferably has a smaller penetration area than the main intake opening. Arranging the auxiliary intake opening at the side enables exhaust gas flowing past the side of the transfer pipe to pass into the transfer pipe. As a result, a pressure loss of the exhaust gas when flowing around the transfer pipe is reduced, as a result of which an installation height—measured in the longitudinal direction—and an installation width—measured in the transverse direction—of the flow channels feeding around the transfer pipe can be reduced. This makes the exhaust gas system more compact. In addition, the auxiliary intake opening assists the formation of the swirl, particularly when the exhaust gas enters the transfer pipe through said auxiliary intake opening as tangentially as possible.

Particularly preferred is an exhaust gas system having two auxiliary intake openings arranged mirror-symmetrically with respect to a plane of symmetry that is defined by the first direction and the longitudinal axis and symmetrically divides the main intake opening and which corresponds to the previously defined plane of symmetry. Auxiliary intake openings, through which the exhaust gas flowing around the transfer pipe can enter the transfer pipe, are therefore provided on the sleeve surface of the transfer pipe to the left and right—viewed in the flow direction of the exhaust gas through the inlet opening. In this way, the pressure loss associated with the circulatory flow is particularly efficiently reduced, which, in turn, enables an additional reduction in the installation height and installation width of the flow channels feeding around the transfer pipe.

Preferably, a greater part of the exhaust gas flow continues to flow completely around the transfer pipe and enters it through the main intake opening. A preferably smaller part of the exhaust gas flow flows in laterally through the auxiliary intake openings, where it assists the formation of the vortex, in particular the double vortex.

Incidentally, preferably all characteristics, including those of the at least one baffle element preferably provided in this region, which have been described previously for the intake opening, in particular for the single intake opening, are realized for the main intake opening. Accordingly, the exemplary embodiment described here preferably differs from the previously described exemplary embodiments only in that at least one auxiliary intake opening, preferably two auxiliary intake openings, is/are provided in addition.

Preferred is an exhaust gas system, in which the at least one auxiliary intake opening has at least one flow guide element, by means of which the exhaust gas can be guided substantially tangentially into the transfer pipe. As a result, the formation of the swirl, in particular of the double vortex, is assisted in a particularly favorable manner, as the exhaust gas is guided tangentially through the at least one auxiliary intake opening into the transfer pipe and in this respect is endowed with a tangential speed component. At the same time, the flow guide element is preferably designed as an outwardly and/or inwardly—viewed in the radial direction, that is to say in a direction lying perpendicular to the longitudinal direction—curved region of the sleeve surface of the transfer pipe. Particularly preferably, both an outwardly and inwardly curved region of the sleeve surface is provided along the whole longitudinal extension of the auxiliary intake opening, thus resulting in a particularly favorable flow guidance in the tangential direction.

The very efficient mixing and also vaporization of the reducing agent in the region of the intake opening and of the transfer pipe enables a separate mixer for distributing the reducing agent injected into the exhaust gas to be dispensed with. This also avoids a pressure loss that would otherwise be caused by the mixer, which is advantageous as a whole for the exhaust gas system and in particular downstream exhaust gas aftertreatment elements.

Preferably, the whole geometric embodiment of the exhaust gas system, in particular the cross-sectional dimensions of the transfer pipe and the dimensions of the intake opening, are chosen such that a swirl rate of at least 0.3 referred to each individual vortex of the double vortex is achieved for the exhaust gas swirl in the transfer pipe. In particular, the geometry of the exhaust gas system is designed depending on a capacity of the internal combustion engine such that an inlet swirl rate of at least 0.3 is achieved.

BRIEF DESCRIPTION OF THE DRAWING FIGURES

The invention is explained in more detail below with reference to the drawing. In the drawing.

DETAILED DESCRIPTION

Figure 1:
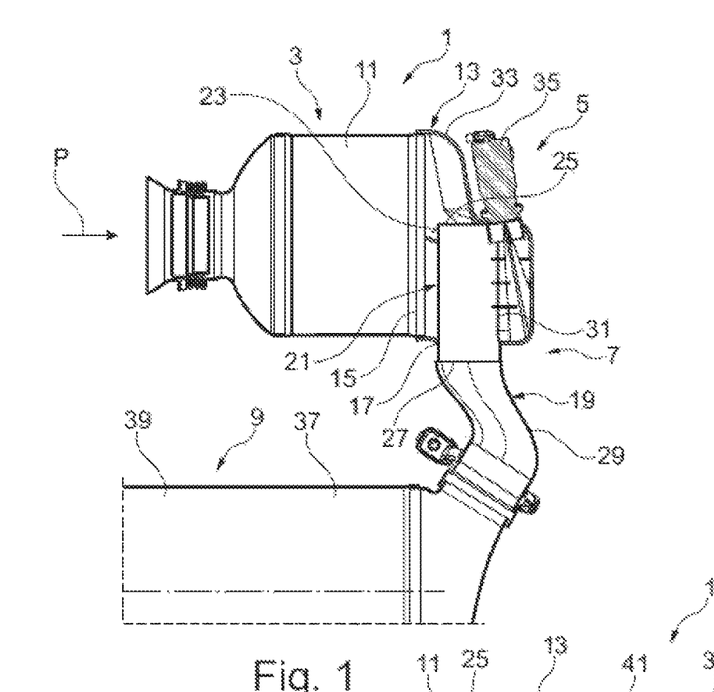
FIG. 1 shows a schematic longitudinal sectional diagram of a first exemplary embodiment of an exhaust gas system.

FIG. 1 shows a schematic longitudinal sectional diagram of a first exemplary embodiment of an exhaust gas system 1. This is used for exhaust gas routing and exhaust gas aftertreatment in a motor vehicle. It comprises a first exhaust gas aftertreatment element 3, a mixing device 5 by means of which a reducing agent is mixed with the exhaust gas flow, wherein the mixing device 5 has a mixing section 7, and a second exhaust gas aftertreatment element 9.

Coming from an internal combustion engine, exhaust gas flows in the direction of an arrow P into the first exhaust gas aftertreatment element 3. It flows through this and hence passes to the mixing device 5, where it is mixed with the reducing agent. Mixing and homogenization is intensified along the mixing section 7 until the exhaust gas finally enters the second exhaust gas aftertreatment element 9. This, in turn, leaves it in the direction of an exhaust pipe which is not shown. Here, it is in no way excluded that further exhaust gas aftertreatment elements are connected to the second exhaust gas aftertreatment element 9. Likewise not excluded is that—viewed in the flow direction of the exhaust gas— further exhaust gas aftertreatment elements are provided before the first exhaust gas aftertreatment element 3.

Here, the first exhaust gas aftertreatment element 3 is in the form of an oxidation catalytic converter 11, particularly preferably a diesel oxidation catalytic converter. The exhaust gas system 1, in particular the mixing device 5, comprises a first exhaust gas duct element 13 with an inlet opening 15 and an outlet opening 17. A second exhaust gas duct element 19, which, in particular, is associated with the mixing section 7, comprises a transfer pipe 21 having a longitudinal axis extending in the vertical direction in FIG. 1, a sleeve surface 23 and a first, closed end 25. A second, open end 27 merges, preferably in one piece, into an exhaust gas pipe 29, which is likewise encompassed by the second exhaust gas duct element 19 and, in the exemplary embodiment shown in FIG. 1, is curved and is part of the mixing section 7, and through which exhaust gas flows to the second exhaust gas aftertreatment element 9.

An intake opening 31, which is arranged facing away from the inlet opening 15 of the first exhaust gas duct element 13—viewed in the flow direction of the exhaust gas—is provided in the sleeve surface 23 adjacent to the closed end 25.

It can be seen here that the first exhaust gas duct element 13 is in the form of an outlet funnel 33 of the oxidation catalytic converter 11. It is also scoop-shaped, in that an imaginary plane defined by the inlet opening 15, the normal vector of which lies parallel to the flow direction of the exhaust gas flowing into the first exhaust gas duct element 13, lies substantially perpendicular to an imaginary plane defined by the outlet opening, the normal vector of which is in turn oriented parallel to the flow direction of the outflowing exhaust gas. The transfer pipe 21 projects through the outlet opening 17 into the scoop-shaped outlet funnel 33, wherein the closed end 25 and the intake opening 31 are accommodated therein.

The transfer pipe 21 is accommodated in an interlocking manner in the outlet funnel 33 in the region of the outlet opening 17, wherein the geometry of the outlet opening 17 is preferably formed in a complementary manner to the cross-sectional form of the transfer pipe 21 in the location of the outlet opening 17. In addition, the transfer pipe 21 is preferably welded to the outlet funnel 33 in the region of the outlet opening 17, thus resulting in an interlocking and substance-to-substance bonded, sealed connection at this point. Accordingly, it is impossible for exhaust gas to escape from the first exhaust gas duct element 13 at the sleeve surface 23 of the transfer pipe 21 through the outlet opening 17 and bypass it on the outside. Rather, all the exhaust gas flowing into the first exhaust gas duct element 13 through the intake opening 31 must enter the transfer pipe 21 and thereby the second exhaust gas duct element 19, and onward through this through the exhaust gas pipe 29 to the second exhaust gas aftertreatment element 9.

Furthermore, the mixing device 5 comprises an injector unit 35 that is fixed to the first exhaust gas duct element 13 and by means of which a reducing agent, which is preferably liquid in the initial state, preferably an aqueous urea solution, can be injected into the exhaust gas flow.

It can be seen that the exhaust gas flowing in along the direction indicated by the arrow P flows through the oxidation catalytic converter 11 along the same direction and continues along this through the inlet opening 15 into the first exhaust gas duct element 13, namely the outlet funnel 33. This flow direction is also referred to as the first direction. Furthermore, it can be seen that the longitudinal axis of the transfer pipe 21 lies perpendicular to the first direction indicated by the arrow P. The exhaust gas is therefore not—as with the known exhaust gas system—deflected by approximately 90° before it reaches the transfer pipe 21, but instead flows thereto along the first direction in which it also passed through the oxidation catalytic converter 11. As a result, a pressure loss is effectively avoided or minimized.

Furthermore, it can be seen that the injector unit 35 is arranged and designed such that the reducing agent injected thereby into the exhaust gas flow is injected into the first exhaust gas duct element 13 upstream of the intake opening 31. This is explained in more detail below. Mixing of the reducing agent with the exhaust gas takes place in the region of the injection upstream of the intake opening 31, in the transfer pipe 21 and in the mixing section 7. If the reducing agent is an aqueous urea solution, the urea is furthermore converted to ammonia by thermolysis and/or hydrolysis.

The mixture of exhaust gas and reducing agent passes through the exhaust gas pipe 29 to the second exhaust gas aftertreatment element 9, which is in the form of a filtering or catalytic element and preferably initially comprises a particulate filter 37, in particular a diesel particulate filter, and—viewed in the flow direction of the exhaust gas—immediately after this a catalytic exhaust gas treatment unit, in particular a catalytic converter for a selective catalytic reaction, namely a so-called SCR catalytic converter 39, a hydrolysis catalytic converter, an oxidation catalytic converter and/or a nitrogen oxide storage catalytic converter. The particulate filter 37 is preferably coated with a material having catalytic properties in the sense of a selective catalytic reaction, so that a reduction of nitrogen oxides preferably takes place as early as in the particulate filter 37 and is then intensified and continued in the SCR catalytic converter 39.

Figure 2:
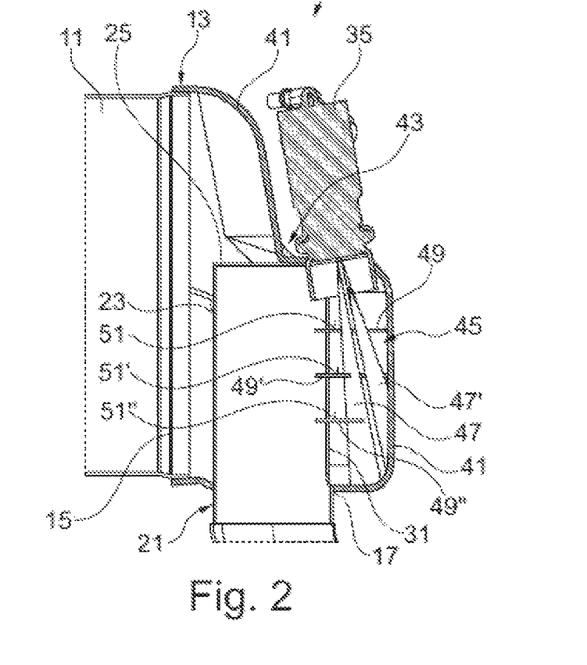
FIG. 2 shows an enlarged detail diagram of the exhaust gas system according to FIG. 1.

FIG. 2 shows a detailed enlargement of the exemplary embodiment of the exhaust gas system 1 according to FIG. 1. The same and functionally equivalent elements are designated by the same references so that, in this respect, reference can be made to the previous description. The closed end 25 is preferably in the form of a cover of the transfer pipe 21 or, particularly preferably, in the form of a terminating sheet metal element welded on the sleeve surface 23 so as to form a seal. A wall 41 of the first exhaust gas duct element 13 is curved inwards in a rear region 43—viewed in the flow direction of the exhaust gas—of the closed end 25 and preferably placed on the closed end 25 to form a seal. Exhaust gas flowing into the first exhaust gas duct element 13 therefore cannot flow through the transfer pipe 21, in particular not beyond its closed end 25, but rather it must flow around the side of the transfer pipe 21 in order to reach the side facing away from the inlet opening 15 and therefore the intake opening 31.

In the exemplary embodiment shown, this is in the form of a rectangular slot having its longer extension along the longitudinal axis of the transfer pipe 21. In the exemplary embodiment shown—viewed in the longitudinal direction—the intake opening 31 directly borders the closed end 25 and extends—again viewed in the longitudinal direction—as far as the outlet opening 17.

It is possible that the intake opening 31 does not directly border the closed end 25 but is arranged at a distance therefrom. However, such a distance is preferably chosen to be substantially smaller than a longitudinal extension of the intake opening 31 in order to avoid a dead zone in the region of the closed end 25 in which no efficient exhaust gas flow and in particular no mixing of the exhaust gas with reducing agent takes place. It is also possible that the intake opening 31 does not extend as far as the outlet opening 17 but is at a distance—viewed in the longitudinal direction—therefrom. In this case, however, a flow resistance for the exhaust gas formed by the intake opening 31 is increased, on account of which an exemplary embodiment in which the intake opening 31 extends as far as the outlet opening 17 is preferred.

It can be seen from FIG. 2 that the first exhaust gas duct element 13 has a flow chamber 45, which, with regard to the transfer pipe 21, faces away from the inlet opening 15—viewed in the first direction—and is arranged—viewed in the flow direction—before the intake opening 31. Exhaust gas flowing from the oxidation catalytic converter 11 through the inlet opening 15 is deflected around the transfer pipe 21, wherein the partial flows flowing past the transfer pipe 21 to the left and right meet in the flow chamber 45 effectively behind the transfer pipe 21. The exhaust gas then flows out of the flow chamber 45 via the intake opening 31 into the transfer pipe 21.

The injector unit 35 is aligned such that, in the exemplary embodiment two injection streams 47, 47' are illustrated, which are sprayed from the injector unit 35 and directed into the flow chamber 45. The injection streams 47, 47' are in each case conical and open out viewed along an injection direction. Here, it can be seen that a longitudinal axis of the cone of the injection streams 47, 47' is aligned at an acute angle to the longitudinal axis of the transfer pipe 21, wherein the injection streams 47, 47' are directed away from the intake opening 31. They are therefore not directed in the direction of the intake opening 31, but rather towards the wall 41 against which they also at least partially impinge. The angle which the injection streams 47, 47', in particular their longitudinal axes, enclose with the longitudinal axis of the transfer pipe 21 is preferably no more than 45°.

Here, three baffle elements 49, 49', 49", which are fixed to the transfer pipe 21 and/or to the wall 41 of the first exhaust gas duct element 13, preferably welded at this point, are arranged in the flow chamber 45. The baffle elements 49, 49', 49" have a baffle surface 51, 51', 51" facing the injector unit 35, wherein the normal vector thereof is aligned substantially parallel to the longitudinal axis of the transfer pipe 21. The three baffle elements 49, 49', 49" are arranged one after the other—viewed in the direction of the longitudinal axis of the transfer pipe 21—and parallel to one another with regard to their baffle surfaces 51, 51', 51".

The injection streams 47, 47' now impinge at least partially on the baffle surfaces 51, 51', 51", wherein drops of reducing agent bounce off the baffle surfaces 51, 51', 51". Preferably, the baffle elements 49, 49', 49" are at least at a Leidenfrost temperature of the reducing agent, so that the vaporization and the bouncing-off of the drops of reducing agent is optimized. Here, they are heated either indirectly by the sleeve surface 23 and/or the wall 41 as well as by the exhaust gas which flows around them, or a direct heating device for heating the baffle elements 49, 49', 49" is provided. Reducing agent droplets that bounce off the baffle surfaces 51, 51', 51" preferably impinge against opposing baffle elements 49, 49', 49", thus resulting in multiple bouncing, wherein each drop successively disintegrates into ever smaller droplets. This and the heat transfer in the region of the baffle surfaces 51, 51', 51" promotes vaporization of the reducing agent. The same applies to the collision of the reducing agent with the wall 41 and a bouncing of reducing agent droplets therefrom.

As the vaporization of the reducing agent already takes place to a considerable extent in the flow chamber 45 before entry into the transfer pipe 21, the mixing and, if appropriate, also a hydrolysis and/or thermolysis of the reducing agent is considerably improved, as a result of which the mixing section 7 can be made shorter overall.

It can also be seen that the baffle elements 49, 49', 49" overlap the intake opening 31 along a direction that is oriented transversely, in the exemplary embodiment shown in particular perpendicularly, to the longitudinal axis of the transfer pipe 21. Exhaust gas, which flows around the transfer pipe 21, is therefore subjected to only a minimal flow resistance due to the baffle elements 49, 49', 49", thus resulting in an extremely small pressure loss due to the baffle elements 49, 49', 49".

It is possible for probes for exhaust gas measurements to be arranged in a region of the first exhaust gas duct element 13 that faces away from the flow chamber 45 and towards the inlet opening 15. As the flow chamber 45 is effectively shielded from this region by the transfer pipe 21, the probes and also the oxidation catalytic converter 11 are protected against reducing agent splashes and drops of reducing agent.

It can also be seen that the injection streams 47, 47' impinge perpendicularly, at most at an acute angle, on the baffle surfaces 51, 51', 51". In doing so, an angle between the injection streams 47, 47' and the normal vectors of the baffle surfaces 51, 51', 51" is preferably no more than 45°. This efficiently assists a bouncing-off of the drops of reducing agent from the baffle surfaces 51, 51', 51".

Figure 3:
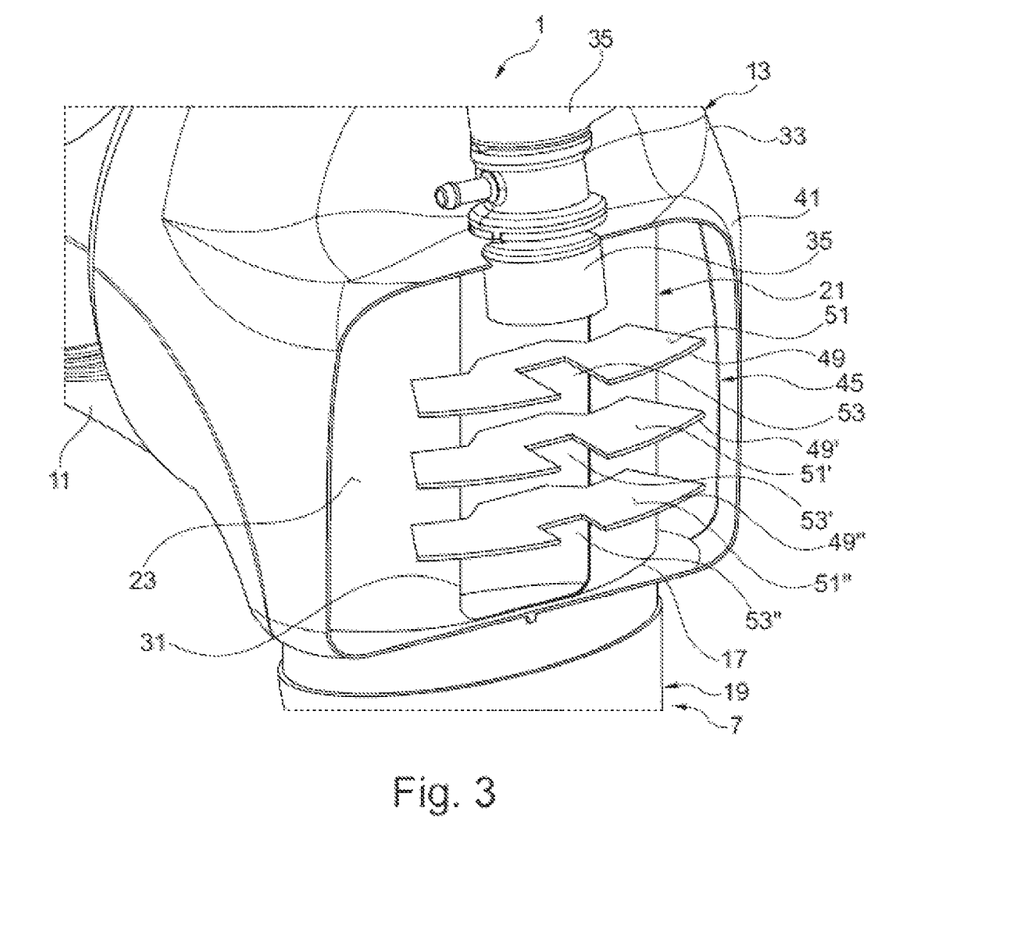
FIG. 3 shows a partially sectioned, three-dimensional diagram of the exemplary embodiment of an exhaust gas system according to FIGS. 1 and 2.

FIG. 3 shows a partially sectioned, three-dimensional diagram of the exemplary embodiment of the exhaust gas system 1 according to FIGS. 1 and 2. The same and functionally equivalent elements are designated by the same references so that, in this respect, reference can be made to the previous description. FIG. 3 shows that the transfer pipe 21, which projects into the first exhaust gas duct element, is accommodated in the outlet opening 17 in an interlocking manner. Preferably, a substance-to-substance bond, in particular by welding, is also provided.

Furthermore, it is shown in FIG. 3 that the intake opening 31 is in the form of a rectangular slot which—viewed in the longitudinal direction—extends as far as but not beyond the outlet opening 17. Preferably, it extends from the closed end 25, which is not shown in FIG. 3, as far as the outlet opening 17. It is not difficult to see from FIG. 3 that the intake opening 31 has a larger extension in the direction of the longitudinal axis of the transfer pipe 21 than perpendicular thereto, so that the rectangular slot formed by the intake opening 31 extends in the longitudinal direction of the transfer pipe 21.

From FIG. 3, it is also clear that the first exhaust gas duct element 13 effectively overlaps the transfer pipe 21, wherein exhaust gas flowing out of the oxidation catalytic converter 11 into the outlet funnel 33 flows around the side of the transfer pipe 21 into the flow chamber 45. Here, it enters the transfer pipe 21 through the intake opening 31.

In the exemplary embodiment shown, the transfer pipe 21 is cylindrical and—viewed in cross-section—oval in shape. Here, the intake opening 31 is arranged centrally—with regard to the longer axis of the oval cross-sectional area—on the side of the transfer pipe 21 which—viewed along the shorter axis—faces away from the inlet opening 15. Exhaust gas flowing in through the intake opening 31 therefore forms two opposing, stable exhaust gas flow vortices in the transfer pipe 21 with, preferably, approximately circular shape—viewed from above—in each case.

Particularly preferably, a ratio between the long axis of the oval cross-section of the transfer pipe 21 and its short axis is approximately two. In this case, a particularly stable double vortex, which is preferably maintained along the whole mixing section 7, in particular also in the exhaust gas pipe 29 as far as an inlet funnel of the second exhaust gas aftertreatment element 9, is formed. A width—measured perpendicular to the longitudinal axis of the transfer pipe 21—of the intake opening 31 is preferably less than the small axis of the oval cross-sectional form of the transfer pipe 21.

In the exemplary embodiment shown in FIGS. 1 to 3, the intake opening 31 is the only opening made in the sleeve surface 23. Only one intake opening 31 in total is therefore provided. The exhaust gas coming from the oxidation catalytic converter 11 must accordingly all flow around the transfer pipe 21 before it can enter it through the intake opening 31. As a result, it is already endowed with a swirl when flowing around the transfer pipe 21, which contributes to achieving a swirl in the transfer pipe 21 with high kinetic energy, in particular with a swirl rate of at least 0.3 referred to each individual vortex of the double vortex and in particular also with an inlet swirl rate of at least 0.3.

The baffle elements 49, 49', 49" are explained in more detail below. Here, these are formed as baffle plates overlapping the intake opening 31 perpendicular to the longitudinal axis of the transfer pipe 21 and are therefore oriented parallel to a flow of exhaust gas in the flow chamber 45.

A cutout 53, 53', 53", which is arranged such that the injection streams 47, 47', which are not shown in FIG. 3, are directed onto the cutouts 53, 53', 53" in certain areas, is provided in each of the baffle surfaces 51, 51', 51". Part of the reducing agent enveloped by the injection streams 47, 47' is therefore sprayed through the cutouts 53, 53', 53" without contact with the baffle surfaces 51, 51', 51", while another part is effectively peeled off in that it collides with the baffle surfaces 51, 51', 51" surrounding said cutouts. At the same time, it can be seen that penetration areas for the injection streams 47, 47' defined by the cutouts 53, 53', 53" reduce in the direction of the injection streams 47, 47'—that is to say downwards in FIG. 3—from baffle element to baffle element. The proportion of reducing agent passing through the cutouts 53, 53', 53" therefore reduces from cutout to cutout.

The injection streams 47, 47' are therefore peeled off by the cutouts 53, 53', 53".

Here, it is preferably provided that a depth of the cutouts 53, 53', 53", which is measured along the first direction and perpendicular to the longitudinal axis of the transfer pipe 21, reduces from baffle element to baffle element. Alternatively or in addition, it is also possible for a width of the cutouts 53, 53', 53" measured perpendicular to the first direction and perpendicular to the longitudinal axis of the transfer pipe 21 to reduce from baffle element to baffle element. In the exemplary embodiment shown, the penetration areas reduce in that both the depth and the width of the cutouts 53, 53', 53" reduce. A particularly efficient peeling-off of the injection streams 47, 47' is achieved by this means. As a whole, the vaporization and, if appropriate, also a hydrolysis and/or thermolysis of the reducing agent is optimized thereby. The formation of a vortex, which is produced when the injection streams 47, 47' peel off at the edges of the baffle elements 49, 49', 49", also contributes thereto.

All in all, the reducing agent is already very efficiently vaporized in the flow chamber 45 both by the baffle elements 49, 49', 49", which in this regard act as vaporization elements, and by the wall 41 and is intensively distributed by the exhaust gas flow flowing into the intake opening 31. This distribution is further intensified by the formation of the stable double vortex in the transfer pipe 21. As the vaporization and mixing takes place very efficiently, a separate, additional mixing device can be dispensed with. In addition, the mixing section 7 can be made significantly shorter than in known exhaust gas systems, as an early and very rapid vaporization and homogenization of the reducing agent occurs.

From FIG. 3 it can also be seen that both the injector unit 35 and the baffle elements 49, 49', 49" and ultimately the injection streams 47, 47', which are not shown, are arranged symmetrically with respect to a plane of symmetry dividing the intake opening 31 symmetrically, wherein both the first direction and the longitudinal direction of the transfer pipe 21 lie in the plane of symmetry. In particular, the baffle elements 49, 49', 49" and the injection streams 47, 47' and, preferably, also the injector unit 35 are arranged mirror-symmetrically with respect to the plane of symmetry. As the vortices which form, collectively therefore the double vortex, is formed mirror-symmetrically with respect to the plane of symmetry, this results overall in a symmetrical distribution of the reducing agent in the two vortices, therefore in the symmetrical double swirl, the consequence of which is a particularly intensive equalization or homogenization of the reducing agent concentration in the exhaust gas flow.

Figure 4:
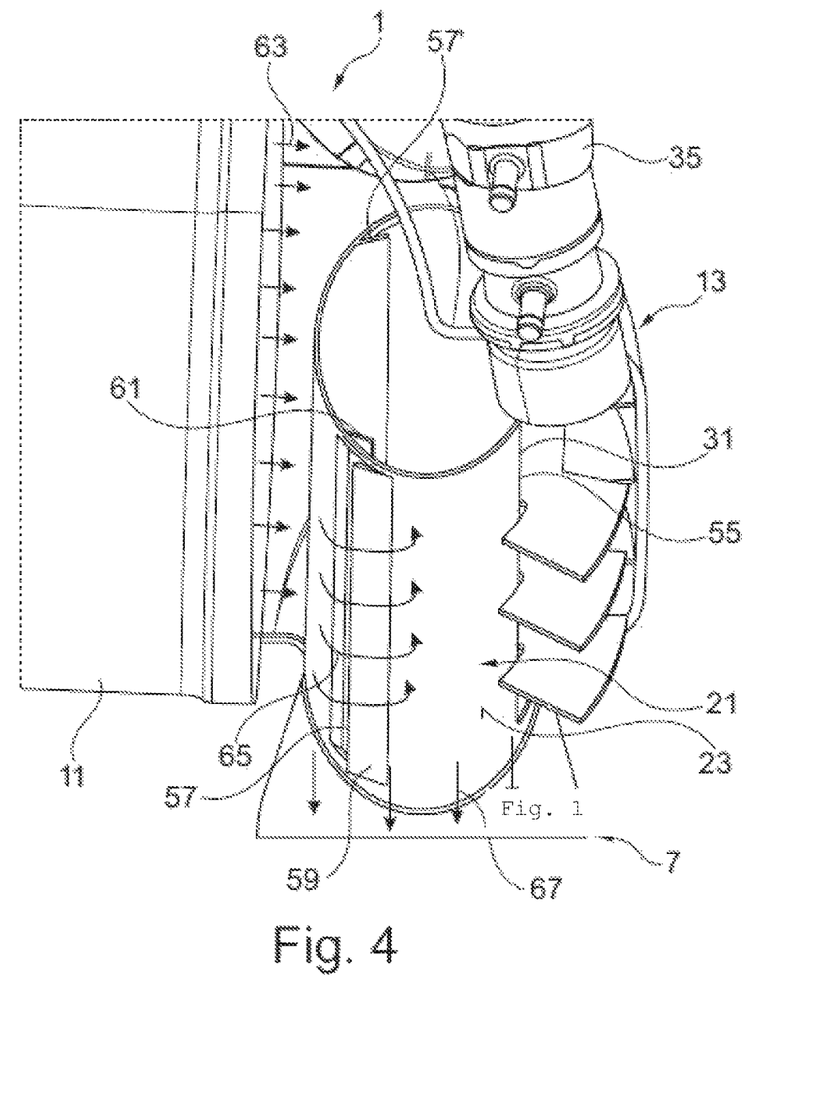
FIG. 4 shows a partially sectioned, three-dimensional diagram of a second exemplary embodiment of an exhaust gas system.

FIG. 4 shows a partially broken away, three-dimensional diagram of a second exemplary embodiment of an exhaust gas system 1. The same and functionally equivalent elements are designated by the same references so that, in this respect, reference can be made to the previous description. The exemplary embodiment according to FIG. 4 differs from the exemplary embodiment according to FIGS. 1 to 3 in that, here, the intake opening 31 is not provided as a single intake opening but, rather, is designed as a main intake opening 55. As in the exemplary embodiment described above, it is arranged facing away from the inlet opening 15 and is in the form of a rectangular slot.

Viewed along the first direction, two auxiliary inlet openings 57, 57', which have a smaller penetration cross-section than the main intake opening 55, are provided in the exemplary embodiment shown in FIG. 4. The auxiliary intake openings 57, 57' are also provided with a larger extension viewed in the direction of the longitudinal axis of the transfer pipe 21 than perpendicular thereto. Preferably, they are likewise in the form of a slot with rectangular penetration area.

Viewed from the incoming exhaust gas flowing out of the oxidation catalytic converter 11, the auxiliary intake openings 57, 57' are formed on the left and right of the transfer pipe 21, wherein, particularly preferably, they are arranged mirror-symmetrically with respect to the plane of symmetry. Exhaust gas flowing past the transfer pipe 21 enters the interior of the transfer pipe 21 substantially tangentially through the auxiliary intake openings 57, 57', as a result of which the formation of the double vortex is assisted.

The auxiliary intake openings 57, 57' reduce a pressure loss that would otherwise be produced, as the transfer pipe 21 presents a flow resistance opposing the inflowing exhaust gas, wherein this must first flow completely around the transfer pipe 21 before it can enter through the intake opening 31. The pressure loss reduces, as part of the exhaust gas flow already enters the transfer pipe 21 at the side through the auxiliary intake openings 57, 57', while the remaining portion flows further to the main intake opening 55. At the same time, it is preferably provided that the greater part of the exhaust gas flow enters the transfer pipe 21 through the main intake opening 55, while the lesser part of the exhaust gas flow flows in through the auxiliary intake openings 57, 57'. In particular, this can be ensured by appropriate design of the penetration areas of the main intake opening 55 on the one hand and of the auxiliary intake openings 57, 57' on the other. As a result of reducing the pressure loss and the smaller proportion of exhaust gas which has to flow past the side of the transfer pipe 21, an installation height—measured in the direction of the longitudinal axis of the transfer pipe 21—and a width measured perpendicular thereto and perpendicular to the first direction of flow channels which feed around the outside of the transfer pipe 21 and are formed by the wall 41 of the first exhaust gas duct element 13 on the one hand and the sleeve surface 23 on the other can be reduced. Accordingly, all in all, the first exhaust gas duct element 13 can be made more compact, wherein it encompasses the transfer pipe 21 which projects into it more closely.

In order to optimally assist or at least not to weaken the double vortex formed in the transfer pipe 21, it is important that the exhaust gas flows in tangentially through the auxiliary intake openings 57, 57'. This is ensured by at least one flow guide element.

This is explained below solely in conjunction with the auxiliary intake opening 57. The auxiliary intake opening 57' is, however, formed identically or mirror-symmetrically to the auxiliary intake opening 57, so everything which is stated below with regard to the auxiliary intake opening 57 also applies equally to the auxiliary intake opening 57'.

Two flow guide elements 59, 61, which are arranged and designed such that a tangential inflow of exhaust gas into the transfer pipe 21 through the auxiliary intake opening 57 is guaranteed, are provided.

Here, the flow guide element 59 is in the form of an outwardly curved region—viewed in the radial direction—of the sleeve surface 23. Correspondingly, the flow guide element 61 is in the form of an inwardly curved region—viewed in the radial direction—of the sleeve surface 23. Here, a radial direction refers to a direction lying perpendicular to the longitudinal axis of the transfer pipe 21. The flow guide elements 59, 61 are preferably aligned parallel to one another and ensure a directed, tangential inflow of exhaust gas into the transfer pipe 21.

In FIG. 4, the flow of exhaust gas is symbolized by arrows, wherein a first host of arrows, of which one is identified here by the reference 63, shows how the exhaust gas coming from the oxidation catalytic converter 11 flows into the first exhaust gas duct element 13 and towards the transfer pipe 21. It is clear that the transfer pipe 21 is arranged with its long cross-sectional axis transversely, in particular perpendicular, to the first direction of the inflowing exhaust gas, while it is aligned with its short cross-sectional axis parallel to the first direction. A host of curved arrows, of which one is identified here by the reference 65, shows how part of the exhaust gas flow which flows around the transfer pipe 21 flows tangentially into the transfer pipe 21 through the auxiliary intake opening 57. Not shown is that the greater part of the exhaust gas flow flows around the transfer pipe 21 at the side to the main intake opening 55 where it finally enters the interior of the transfer pipe 21 and where a stable, symmetrical double vortex is formed.

Furthermore, a host of arrows, of which one is identified here by the reference 67, shows how the exhaust gas flows through the second exhaust gas duct element 19, in particular through the mixing section 7 and the exhaust gas pipe 29, which is not shown further, to the second exhaust gas aftertreatment element 9, which is likewise not shown. In doing so, the symmetrical double vortex is preferably maintained as far as an inlet funnel of the second exhaust gas aftertreatment element 9.

All in all, it can be seen that, with the help of the exhaust gas system 1, a particularly efficient, homogenous mixing of the exhaust gas with reducing agent is possible, wherein this is particularly efficiently vaporized and, if appropriate, hydrolyzed or thermalized. This enables the exhaust gas system 1 as a whole to be made very compact and with a comparatively short mixing section 7. It can also be seen that, because of its very compact arrangement, the exhaust gas system 1 shown in the figures is particularly suitable for use in a motor vehicle, the internal combustion engine of which is arranged perpendicular to a longitudinal direction of the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An exhaust gas system for exhaust gas routing and exhaust gas aftertreatment in a motor vehicle, the system comprising:
a first exhaust gas duct element, which has an inlet opening and an outlet opening;
a second exhaust gas duct element, which has a transfer pipe with a longitudinal axis, a sleeve surface, and a first closed end,
wherein the sleeve surface includes an intake opening adjacent to the first closed end,
wherein a portion of the transfer pipe, which includes the first closed end and the intake opening, projects into the outlet opening and is accommodated in the first exhaust gas duct element so that exhaust gas flowing in through the inlet opening in a first direction flows through the intake opening and into the transfer pipe and flows—viewed in a direction of the longitudinal axis of the transfer pipe—in the transfer pipe through the outlet opening out of the first exhaust gas duct element,
wherein the system further comprises an injector unit fixed to the first exhaust gas duct element and is in direct contact with the transfer pipe, the injector unit configured to introduce a reducing agent into an exhaust gas flow flowing through the first and the second exhaust gas duct elements, and
wherein the longitudinal axis of the transfer pipe lies perpendicular to the first direction, and the injector unit is arranged to inject reducing agent into the first exhaust gas duct element upstream of the intake opening and the reducing agent is mixed with the exhaust gas flow before the exhaust gas flow enters the transfer pipe through the intake opening.

2. The exhaust gas system of claim 1, wherein the intake opening is arranged facing away from the inlet opening of the first exhaust gas duct element, and wherein the intake opening has a larger extension in the direction of the longitudinal axis of the transfer pipe than perpendicular to the direction of the longitudinal axis of the transfer pipe.

3. The exhaust gas system of claim 1, wherein the first exhaust gas duct element is an outlet funnel of an oxidation catalytic converter.

4. The exhaust gas system of claim 1, wherein the injection stream is aligned parallel to the longitudinal axis of the transfer pipe.

5. The exhaust gas system of claim 1, wherein the first exhaust gas duct element has a flow chamber which—viewed in the first direction—with regard to the transfer pipe is arranged before the intake opening and faces away from the inlet opening, wherein the injector unit is arranged to direct an injection stream into the flow chamber.

6. The exhaust gas system of claim 5, wherein at least one plate-shaped baffle element is fixed to the transfer pipe or to the first exhaust gas duct element in the flow chamber.

7. The exhaust gas system of claim 6, wherein the baffle element has a baffle surface facing the injector unit, a normal vector of which is aligned parallel to the longitudinal axis of the transfer pipe.

8. The exhaust gas system of claim 7, the baffle element overlaps the intake opening along a direction orientated transversely to the longitudinal axis of the transfer pipe.

9. The exhaust gas system of claim 7, wherein the system includes a plurality of baffle elements, which are arranged one after the other—viewed in the direction of the longitudinal axis of the transfer pipe.

10. The exhaust gas system of claim 9, wherein the plurality of baffle elements are arranged parallel to one another with regard to their baffle surfaces.

11. The exhaust gas system of claim 9, wherein the plurality of the baffle elements each have a cutout in the baffle surface, wherein the cutout is arranged such that the injection stream is directed at the cutout in certain areas.

12. The exhaust gas system of claim 6, wherein the baffle element overlaps the intake opening along a direction orientated transversely to the longitudinal axis of the transfer pipe.

13. The exhaust gas system of claim 6, wherein the system includes a plurality of baffle elements, which are arranged one after the other—viewed in the direction of the longitudinal axis of the transfer pipe.

14. The exhaust gas system of claim 13, wherein the plurality of baffle elements are arranged parallel to one another with regard to their baffle surfaces.

15. The exhaust gas system of claim 13, wherein the plurality of baffle elements each have a cutout in the baffle surface, wherein the cutout is arranged such that the injection stream is directed at the cutout.

16. The exhaust gas system of claim 1, wherein the injector unit is arranged and aligned such that the injection stream is symmetrically arranged with respect to a plane of symmetry defined by the first direction and by the longitudinal direction and the plane of symmetry dividing the intake opening symmetrically.

17. The exhaust gas system of claim 1, wherein the intake opening is a main intake opening arranged facing away from the inlet opening of the first exhaust gas duct element; and wherein the sleeve surface further includes at least one auxiliary intake opening which—viewed along the first direction is arranged at a side of the main intake opening.

18. The exhaust gas system of claim 17, wherein the at least one auxiliary intake opening has a larger extension in the direction of the longitudinal axis of the transfer pipe than perpendicular to the longitudinal axis of the transfer pipe, wherein the at least one auxiliary intake opening is a slot with rectangular penetration area.

19. The exhaust gas system of claim 17, further comprising:

two auxiliary intake openings arranged mirror-symmetrically with respect to a plane of symmetry defined by the first direction and the longitudinal axis and the plane of symmetry symmetrically divides the main intake opening.

20. The exhaust gas system of claim 17, wherein the at least one auxiliary intake opening has at least one flow guide element, by way of which exhaust gas is guided tangentially into the transfer pipe, wherein the at least one flow guide element protrudes outwardly or inwardly with respect to a curved region of the sleeve surface when the transfer pipe is viewed along the longitudinal axis.

* * * * *